(12) United States Patent
Koerner

(10) Patent No.: US 11,290,007 B2
(45) Date of Patent: Mar. 29, 2022

(54) DEVICE FOR COUPLING ELECTRICAL GRIDS

(71) Applicant: HELLA GMBH & CO. KGAA, Lippstadt (DE)

(72) Inventor: André Koerner, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/142,806

(22) Filed: Jan. 6, 2021

(65) Prior Publication Data

US 2021/0159784 A1 May 27, 2021

Related U.S. Application Data

(63) Continuation of application No. PCT/EP2019/067531, filed on Jul. 1, 2019.

(30) Foreign Application Priority Data

Jul. 6, 2018 (DE) ...................... 10 2018 116 486.6

(51) Int. Cl.
*H02M 3/04* (2006.01)
*B60L 53/22* (2019.01)
*H02J 1/10* (2006.01)

(52) U.S. Cl.
CPC ............... *H02M 3/04* (2013.01); *B60L 53/22* (2019.02); *H02J 1/102* (2013.01); *B60L 2210/10* (2013.01)

(58) Field of Classification Search
CPC ....................................................... H02M 3/04
(Continued)

(56) References Cited

U.S. PATENT DOCUMENTS

| 5,019,954 A | 5/1991 | Bourgeault et al. |
| 8,315,076 B2 | 11/2012 | Schmidt et al. |

(Continued)

FOREIGN PATENT DOCUMENTS

| CN | 103337973 A | 10/2013 |
| CN | 107979297 A | 5/2018 |

(Continued)

OTHER PUBLICATIONS

International Search Report dated Sep. 6, 2019 in corresponding application PCT/EP2019/067531.

(Continued)

*Primary Examiner* — Joseph Chang
(74) *Attorney, Agent, or Firm* — Muncy, Geissler, Olds & Lowe, P.C.

(57) ABSTRACT

An apparatus for coupling power systems, in particular a DC system, for example a motor vehicle electrical system, with a single-phase AC system or a further DC system, the apparatus including a non-inverting DC-DC converter and an inverting DC-DC converter, each having a first input and/or output and a second input and/or output, the first input and/or output of the first DC-DC converter being connected in series to a first converter valve to form a first series circuit, and the first input and/or output of the second DC-DC converter being connected in series to a second converter valve to form a second series circuit, the first and second series circuits being connected in parallel, and the second inputs and/or outputs of the DC-DC converters being connected in parallel and the terminals of the parallel circuit of the series circuits being connected to a first input and/or output of the apparatus.

17 Claims, 7 Drawing Sheets

(58) Field of Classification Search
USPC .......................................................... 307/10.1
See application file for complete search history.

(56) References Cited

U.S. PATENT DOCUMENTS

| | | | |
|---|---|---|---|
| 9,242,567 | B2 | 1/2016 | Kim et al. |
| 10,491,103 | B2 | 11/2019 | Willenberg et al. |
| 2012/0242299 | A1* | 9/2012 | Xu ..................... H02M 1/4225 |
| | | | 323/210 |
| 2017/0282728 | A1* | 10/2017 | Jeon ......................... H02J 9/061 |
| 2020/0136504 | A1* | 4/2020 | Schumacher ...... B60H 1/00428 |
| 2021/0028717 | A1* | 1/2021 | Iyasu ........................ H02M 7/12 |

FOREIGN PATENT DOCUMENTS

| | | |
|---|---|---|
| DE | 2652275 A1 | 5/1978 |
| DE | 102006012164 A1 | 7/2007 |
| DE | 102014110758 A1 | 1/2015 |
| DE | 102016207941 A1 | 11/2017 |
| EP | 2624427 A2 | 8/2013 |
| WO | WO9100643 A1 | 1/1991 |

OTHER PUBLICATIONS

Kwasinski, Alexis: "Identification of Feasible Topologies for Multiple-Input DC-DC Converters" IEEE Transactions on Power Electronics, Institute of Electrical and Electronics Engineers, USA, vol. 24, No. 3, Mar. 1, 2009, pp. 856-861, ISSN: 0885-8993, XP011250585.

Dylan Dah-Chuan Lu et al: "Bridgeless Power Factor Correction Circuits with Voltage-Doubler Configuration" Power Electronics and Drive Systems (PEDS), 2011 IEEE Ninth International Conference on, IEEE, Dec. 5, 2011, pp. 1037-1042, DOI: 10.1109/PEDS.2011.6147387, ISBN: 978-1-61284-999-7, XP032112492, p. 1037-p. 1040.

Jong-Won Shin et al: "A Low Common Mode Noise Bridgeless Boost-Buck-Boost Power Factor Correction Rectifier" 2012 IEEE Energy Conversion Congress and Exposition (ECCE), year: 2012, Conference Paper, IEEE, pp. 2901-2907.

* cited by examiner

DEVICE FOR COUPLING ELECTRICAL GRIDS

This nonprovisional application is a continuation of International Application No. PCT/EP2019/067531, which was filed on Jul. 1, 2019, and which claims priority to German Patent Application No. 10 2018 116 486.6, which was filed in Germany on Jul. 6, 2018, and which are both herein incorporated by reference.

BACKGROUND OF THE INVENTION

Field of the Invention

The present invention relates to an apparatus for coupling power systems, in particular a DC system, for example a motor vehicle electrical system, with a single-phase AC system or a further DC system. A coupling apparatus of this type may be used, in particular, to charge a vehicle battery of an electric vehicle with current from a single-phase AC system or from another vehicle. The invention also relates to an arrangement of coupling apparatuses, with the aid of which a DC system may be coupled with a multiphase AC system.

Description of the Background Art

To achieve electrical safety, the charging apparatuses known today for charging batteries of electric vehicles use transformers for the galvanic isolation of the AC system side and the vehicle DC system side, to which the battery is connected. These transformers are complex and heavy.

Coupling apparatuses without transformers are also known, with the aid of which direct-voltage sources, such as photovoltaic generators, are connectable to the AC system. One disadvantage of these coupling apparatuses is that they may be able to generate leakage currents as a function of the parasitic capacitance of the direct-voltage side and the switching or system frequency, which may impair, for example, the function of residual-current protective devices. For use in three-phase systems, multiphase charging converters are also common, which are correspondingly complex for the multiphase conversion.

SUMMARY OF THE INVENTION

It is therefore an object of the present invention to provide a transformer-less coupler, with the aid of which a DC system may be coupled with different power systems.

This object is achieved according to an exemplary embodiment of the invention, in that the apparatus includes a non-inverting DC-DC converter and an inverting DC-DC converter, each having a first input and/or output and a second input and/or output, the first input and/or output of the first DC-DC converter being connected in series to a first converter valve to form a first series circuit, and the first input and/or output of the second DC-DC converter being connected in series to a second converter valve to form a second series circuit, and the first and second series circuits being connected in parallel, and the second inputs and/or outputs of the DC-DC converters being connected in parallel. The terminals of the parallel circuit of the series circuits are connected to a first input and/or output of apparatus according to the invention, and the terminals of the parallel circuit of the second inputs and/or outputs of the DC-DC converters are connected to a second input and/or output of the apparatus.

With the aid of a device according to the invention, it is possible to convert alternating currents into direct currents without using a transformer. Leakage currents, which would be generated using conventional converter circuits for use in vehicle electrical systems, may be avoided with the aid of the apparatus according to the invention. This is possible, in particular, because one terminal of a first input and/or output of one of the two DC-DC converters, preferably of the non-inverting DC-DC converter, or of the first input and/or output of the apparatus is/are connected directly or indirectly to one terminal of the second input and/or output of the same DC-DC converter or of the second input and/or output of the apparatus, with switches or fuses being connected therebetween. Since leakage currents may be reduced, residual-current protective devices may be used to protect life and property.

To save installation space and weight, among other things, the first DC-DC converter and the second DC-DC converter have a shared coil or throttle. The two DC-DC converters may also have shared switches.

The DC-DC converters may be buck converters, boost converters and/or buck-boost converters. They may also be four-quadrant actuators. The DC-DC converters may thus be bidirectional DC-DC converters.

It is then advantageous if the first converter valve and/or the second converter value are bidirectional converter valves. If only power from the first input and/or output is to be transmitted to the second input and/or output, unidirectional converter valves are sufficient, for example diodes which form half-wave rectifiers.

An apparatus according to the invention may include a filter for filtering current ripples on the second side of the DC-DC converter. The filter may be an active filter. The filter may be designed in such a way that it blocks a frequency band in the area of the frequency of the fundamental wave of an AC system connectable to the first input and/or output and the frequencies of the harmonics of the fundamental wave. The filter may include a storage capacitor and may additionally include one or multiple filter capacitors and filter coils, which are assembled into a filter in the known way. The filter may comprise a switch, which connects the filter to the second terminal of the first side of the non-inverting DC-DC converter or to the terminal of the first input and/or output for the neutral conductor or which disconnects it from this terminal.

An arrangement according to the invention for coupling a DC system to a multiphase AC system may include at least two apparatuses according to the invention.

The first inputs and/or outputs of the apparatuses of an arrangement according to the invention may include a first terminal for connecting to one phase conductor of the multiphase AC system, while a second terminal of each input and/or output is connected to a neutral conductor of the multiphase AC system. The second inputs and/or outputs of the apparatuses may be connecting in parallel.

Coils of the DC-DC converters of the apparatuses of an arrangement may be magnetically coupled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 7a through 7d show examples of a circuit implemented with specific components of the apparatus according to the invention illustrated in FIG. 4a.

DETAILED DESCRIPTION

Figure 1:
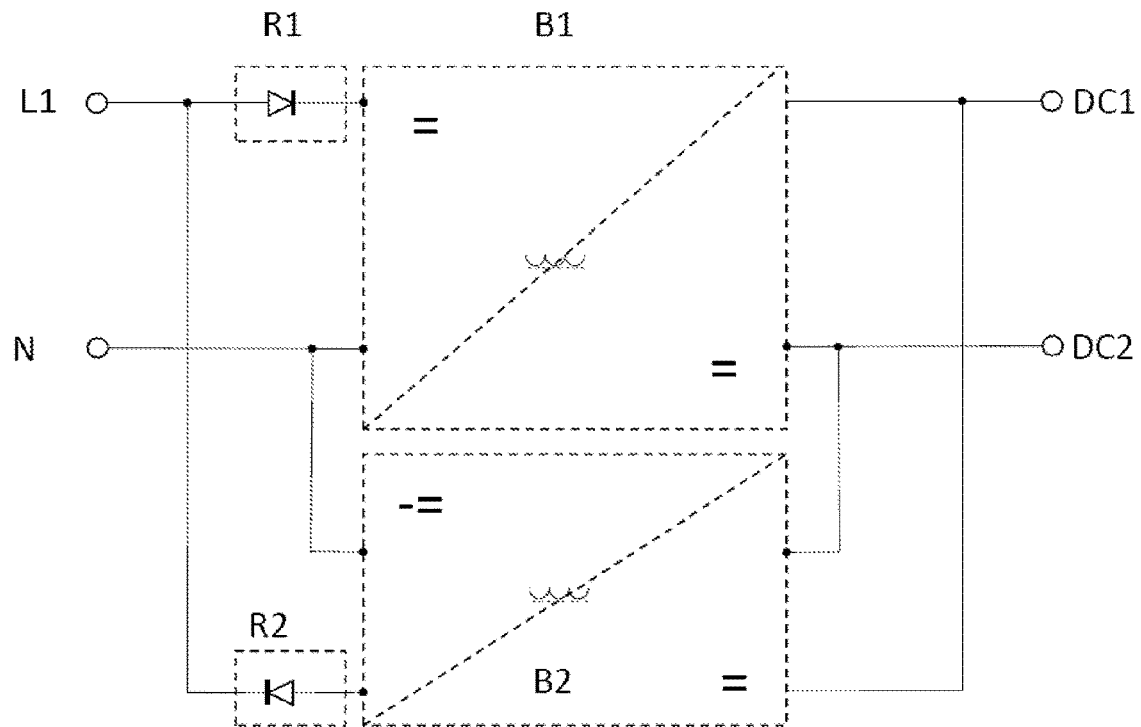
FIG. 1 shows a simplified schematic diagram of a first apparatus according to the invention.

The invention is a single-stage apparatus, without a transformer, for coupling power systems, with the aid of which it is possible to transmit energy preferably between an AC system or three-phase system and a DC system. The DC system may comprise a chargeable battery. The DC system may be a vehicle electrical system, for example a vehicle electrical system of an electric vehicle. The apparatus according to the invention may represent a charging apparatus for the battery of the electric vehicle.

An apparatus according to the invention includes a first half-wave rectifier R1 as the first converter valve, a first, non-inverting DC-DC converter B1, a second half-wave rectifier R2 as the second converter valve and a second, inverting DC-DC converter B2.

First half-wave rectifier R1 is connected to a terminal for positive potential of a first side of first DC-DC converter B1 and to a phase conductor terminal L1 of the apparatus for connection to a phase conductor of a single-phase AC system. A terminal for negative potential of the first side of first DC-DC converter B1 is connected to a terminal N of the apparatus for connection to a neutral conductor of the single-phase AC system.

Second half-wave rectifier R2 is connected to a terminal for negative potential of a first side of second DC-DC converter B2 and to phase conductor terminal L1. A terminal for positive potential of the first side of second DC-DC converter B2 is connected to terminal N of the apparatus for connection to the neutral conductor of the single-phase AC system.

Terminals L1, N form a first input and/or output of the apparatus.

A terminal for positive potential of a second side of first DC-DC converter B1 and a terminal for positive potential of a second side of the second DC-DC converter are connected to each other and run to a first terminal DC1 of the apparatus for the DC system. A terminal for negative potential of a second side of first DC-DC converter B1 and a terminal for negative potential of a second DC-DC converter are likewise connected to each other and led to a second terminal DC2 of the apparatus for the DC system.

Terminals DC1, DC2 form a second input and/or output of the apparatus.

First DC-DC converter B1 may be a boost, buck or buck-boost converter. Second DC-DC converter B2 may be a buck-boost converter.

First DC-DC converter B1 may be designed as a boost converter or as a buck converter in half-bridge topology or as a buck-boost converter in full-bridge topology. Second DC-DC converter B2 is preferably designed as an inverting buck-boost converter in half-bridge topology.

DC-DC converters B1, B2 may operate bidirectionally in the known way, i.e. they may transmit energy either from the first side to the second side or vice versa. The half-wave rectifiers are implemented for this purpose by controllable switching elements. In addition to supplying a battery of the DC system from the DC, single-phase AC or multiphase AC system, the circuit may thus also implement the energy recovery from the battery to the DC, single-phase AC or multiphase AC system or provide reactive power for the AC or multiphase AC system.

The apparatuses illustrated in FIGS. 1, 2, 2a, 2b, 3, 4a, 4b, 5 may be charging devices, e.g. for charging a vehicle battery in the voltage range of up to approximately 500V from an AC supply voltage of e.g. 110V or 230V, which is connected to terminals L1, N. Terminals DC, D2 of the apparatus may lead to the vehicle battery. In advantageous variants, as illustrated in FIGS. 3, 4, 4a, 4b and 5, storage throttles L provided in DC-DC converters B1, B2 and one or multiple switch elements of DC-DC converters B1, B2 may be used together for both DC-DC converters B1, B2, for example to save complexity, installation space and weight of the separate throttles.

One half-wave of the AC voltage present at terminals L1, N for the phase conductor and the neutral conductor is conducted via first half-wave rectifier R1 to first DC-DC converter B1, where it is converted into a higher, lower or same voltage of the same polarity, in terms of absolute value, to then be conducted to terminals D1, D2.

The other half-wave of the AC voltage present at terminals L1, N for the phase conductor and the neutral conductor is conducted via second half-wave rectifier R2 to second DC-DC converter B2, where it is converted into a higher, lower or same voltage of the opposite polarity, in terms of absolute value, to then be conducted to terminals DC1, DC2.

For operation as inverters for supplying the AC system connected to terminals L1 and N from the DC system connected to terminals DC1 and DC2, rectifiers R1 and R2 may be provided with a controllable design, so that they allow current to flow against their rectifier direction upon activation.

During operation as rectifiers with the aid of an input AC voltage at terminals L1, N, DC-DC converters B1, B2 are preferably regulated in such a way that the output DC voltage is largely constant at terminals DC1, DC2, and the current characteristic in terminal L1 largely simultaneously follows the characteristic of the AC voltage at terminal L1. Likewise, DC-DC converters B1, B2 may be regulated in such a way that the current characteristic in terminal DC1 largely simultaneously follows the square of the AC voltage at terminal L1. As a result, the power factor is nearly 1, which is usually an important requirement for coupling high-power loads to AC supply systems.

In inverter mode with an input DC voltage at terminals DC1, DC2, DC-DC converters B1 and B2 are advantageously regulated in such a way that the time characteristic of the output alternating current over terminals L1, N essentially follows the alternating current at terminals L1, N. Deviations therefrom, e.g. in the form of phase shifts or deviations in the absolute value curve, e.g. for implementing grid services, in particular such as reactive power supply, may be implemented in regulating DC-DC converters B1, B2. DC-DC converters B1, B2 generate the current for one of the half-waves of the alternating current in each case.

Neutral conductor N and second terminal DC2 may be connected to each other in the charging device (cf. FIGS. 2, 2a, 2b, 4, 4a, 4b and 5). In an apparatus according to the invention, the terminal of the apparatus for neutral conductor N of the single-phase AC or multiphase AC system may, in principle, be connected to a terminal of the apparatus for a potential (e.g. to the negative pole) of the DC system directly or via fuse elements and disconnector/switching elements.

Figure 2:
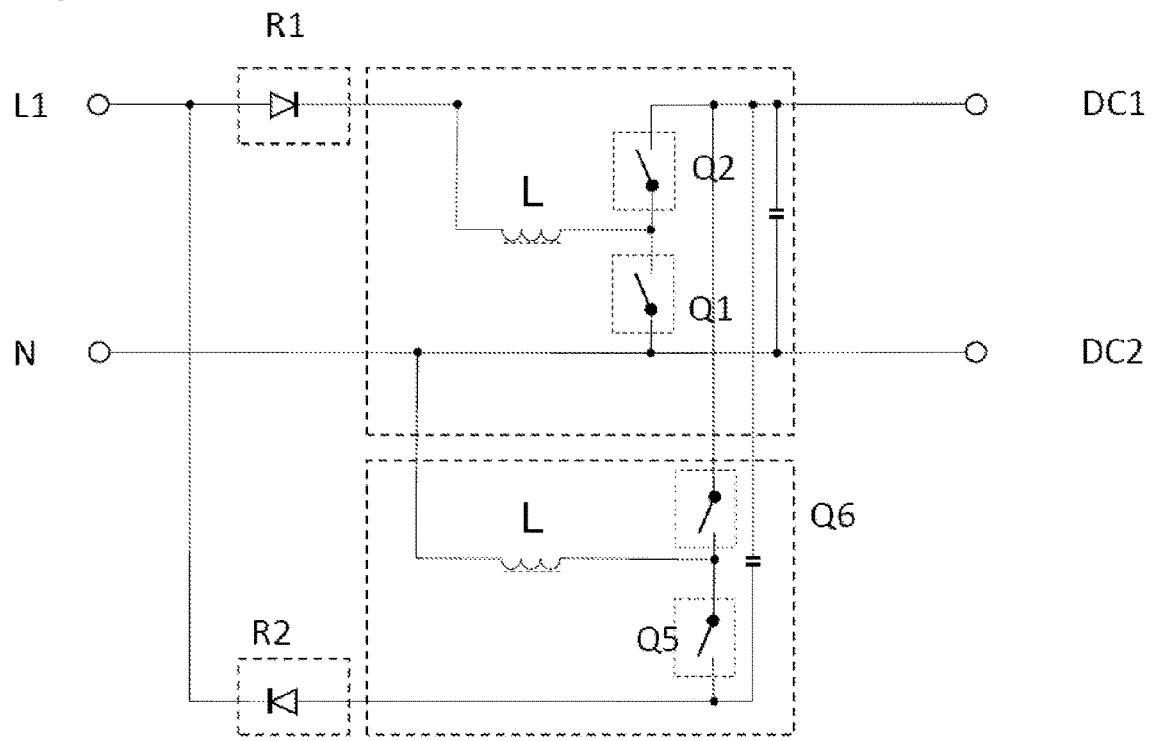
FIGS. 2, 2a, 2b show simplified circuit diagrams of different first apparatuses, including a simplified representation of the inner structure of the DC-DC converters used.
Figure 4:
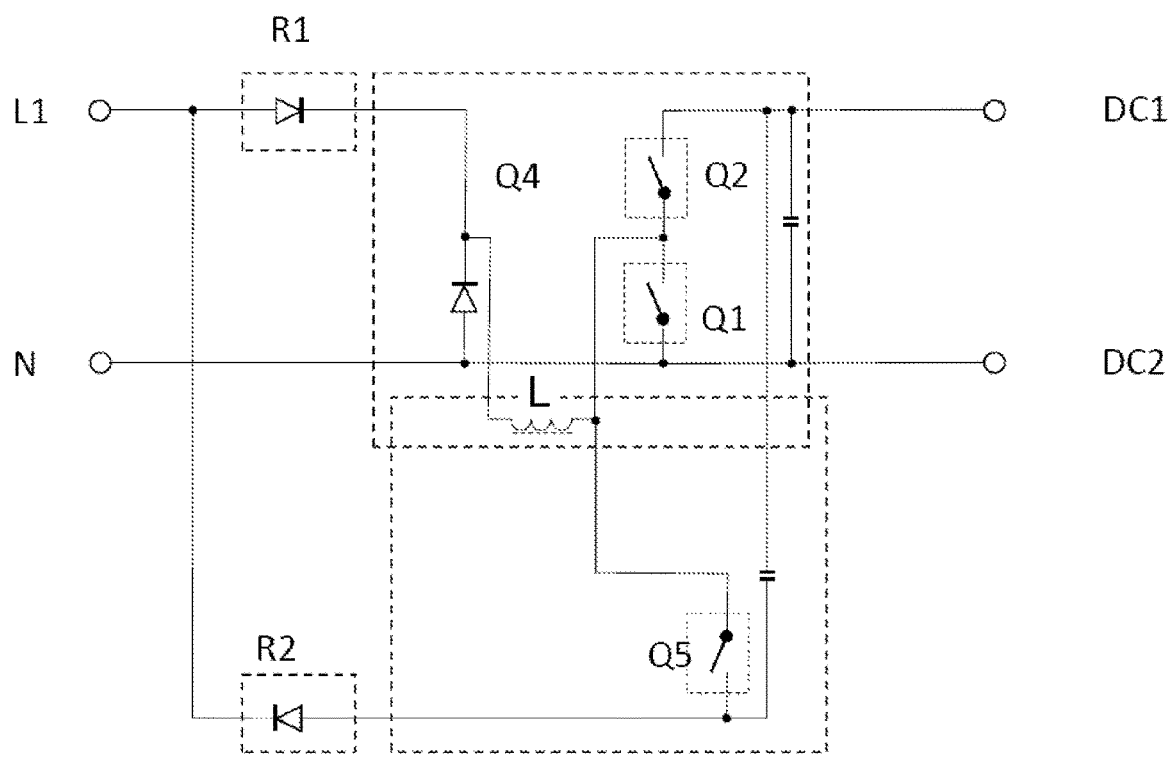
FIGS. 4, 4a, 4b show simplified circuit diagrams of different second apparatuses, including a simplified representation of the inner structure of the DC-DC converters used.

FIG. 2 shows a variant including a non-inverting boost converter B1 and an inverting buck-boost converter B2 for the energy transmission direction from terminals L1, N to terminals DC1, DC2 for applications with higher voltage at DC1, DC2 than the maximum value (e.g. the peak value in the case of an AC voltage) of the voltage at terminals L1, N. This case may occur, e.g. when charging an electric vehicle battery with 250V to 500V DC voltage at AC systems having 110V or when charging an electric vehicle battery with 400V to 900V DC voltage at AC systems having 230V or corresponding three-phase systems. In the variant according to FIG. 2, two separate throttles are used as examples. Switches Q2 and/or Q6 may be passive rectifiers and be implemented, in particular, by diodes. Throttles L may be replaced by a shared throttle, which is used jointly for the inverting converter and the non-inverting converter. This variant is shown in FIG. 4.

Figure 2A:
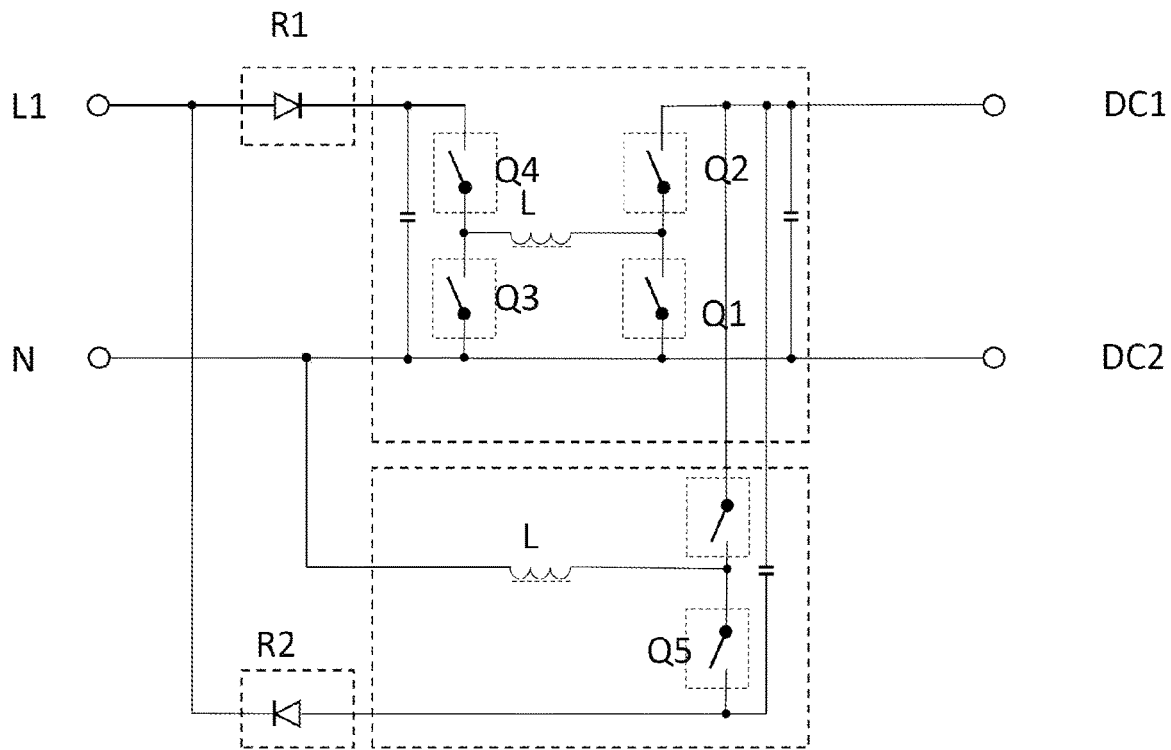
Figure 4A:
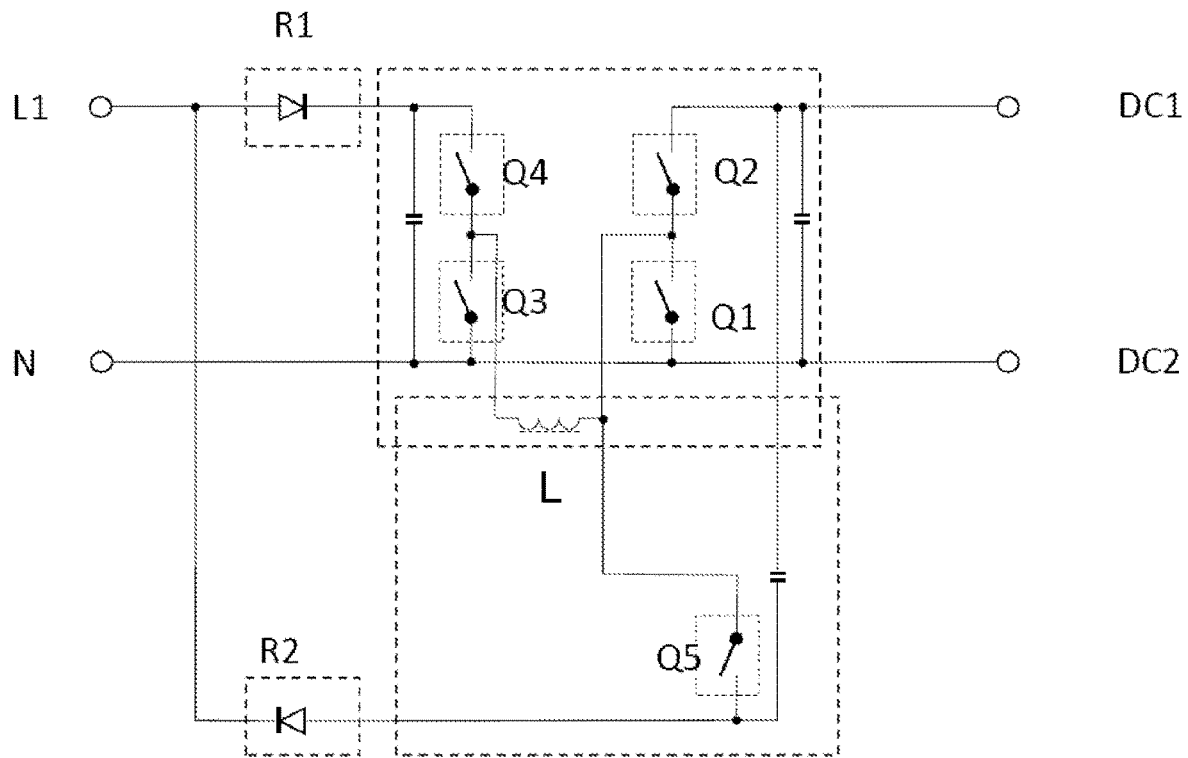

FIG. 2a shows a variant including a non-inverting buck-boost converter and an inverting buck-boost converter for the energy transmission direction from terminals L1, N to terminals DC1, DC2 of the apparatus for applications with temporarily lower and temporarily higher voltage at terminals DC1, DC2 than the maximum value (e.g. the peak value at terminals L1, N) of the voltage at terminals L1, N, e.g. for charging an electric vehicle battery with 200V to 500V DC voltage at AC systems having 230V or corresponding three-phase system. In this case as well, two separate throttles are used as examples. FIG. 4a shows the general case of practical implementation of the joint use of the two storage throttles for a non-inverting buck-boost converter and an inverting buck-boost converter for the energy transmission direction from terminals L1, N to terminals DC1, DC2. This is the preferred variant at AC or three-phase systems having approximately 230V phase voltage and electric vehicle high-voltage DC electrical systems having approximately 250V to 500V.

Figure 2B:
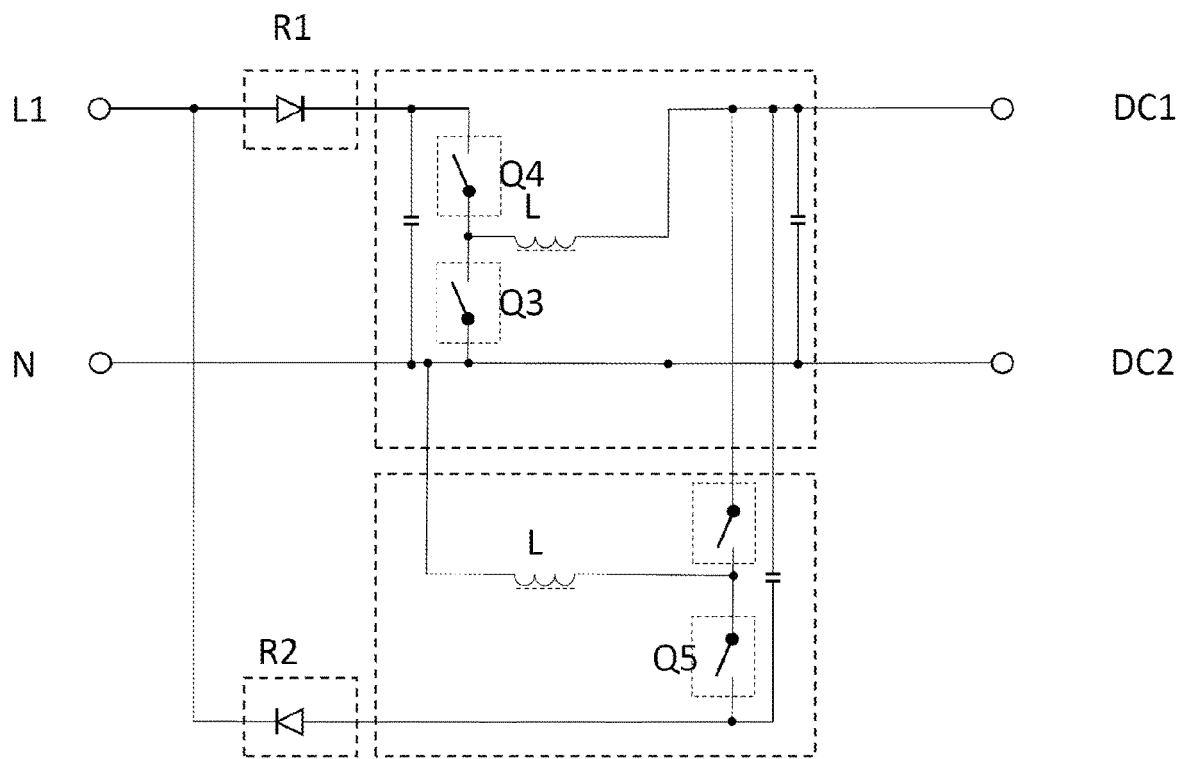
Figure 3:
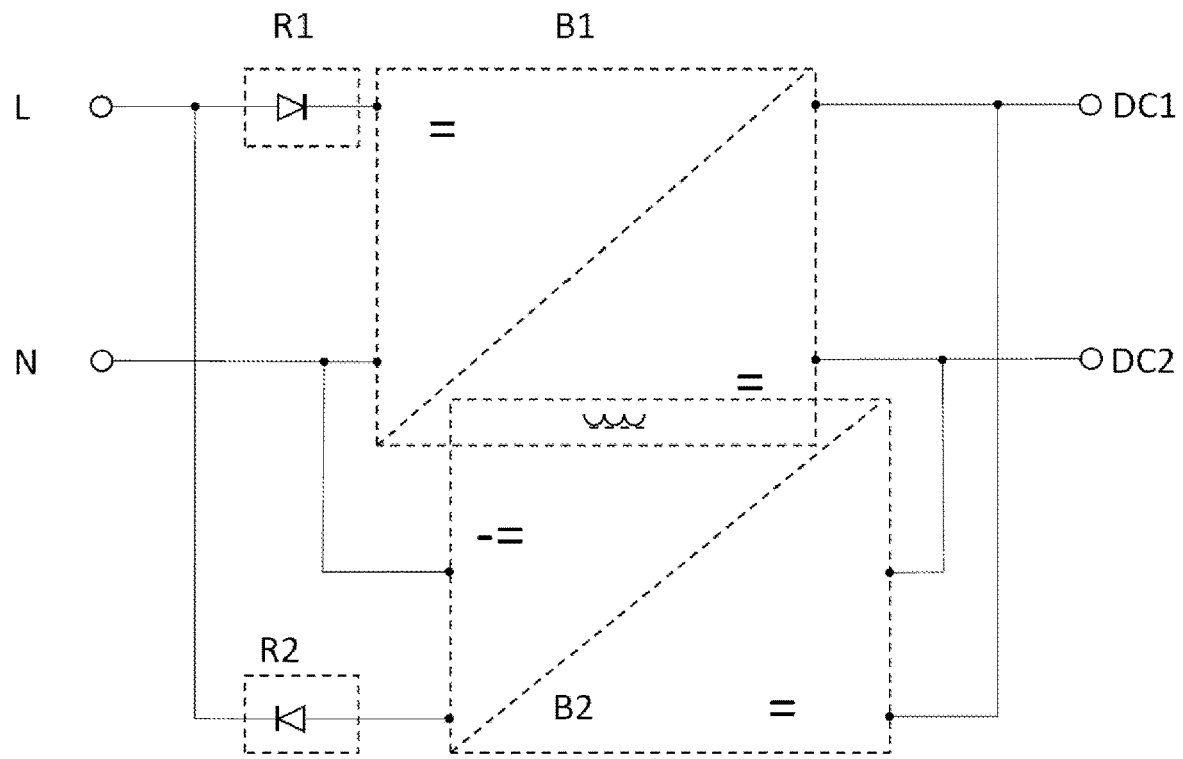
FIG. 3 shows a simplified schematic diagram of a second apparatus according to the invention.
Figure 4B:
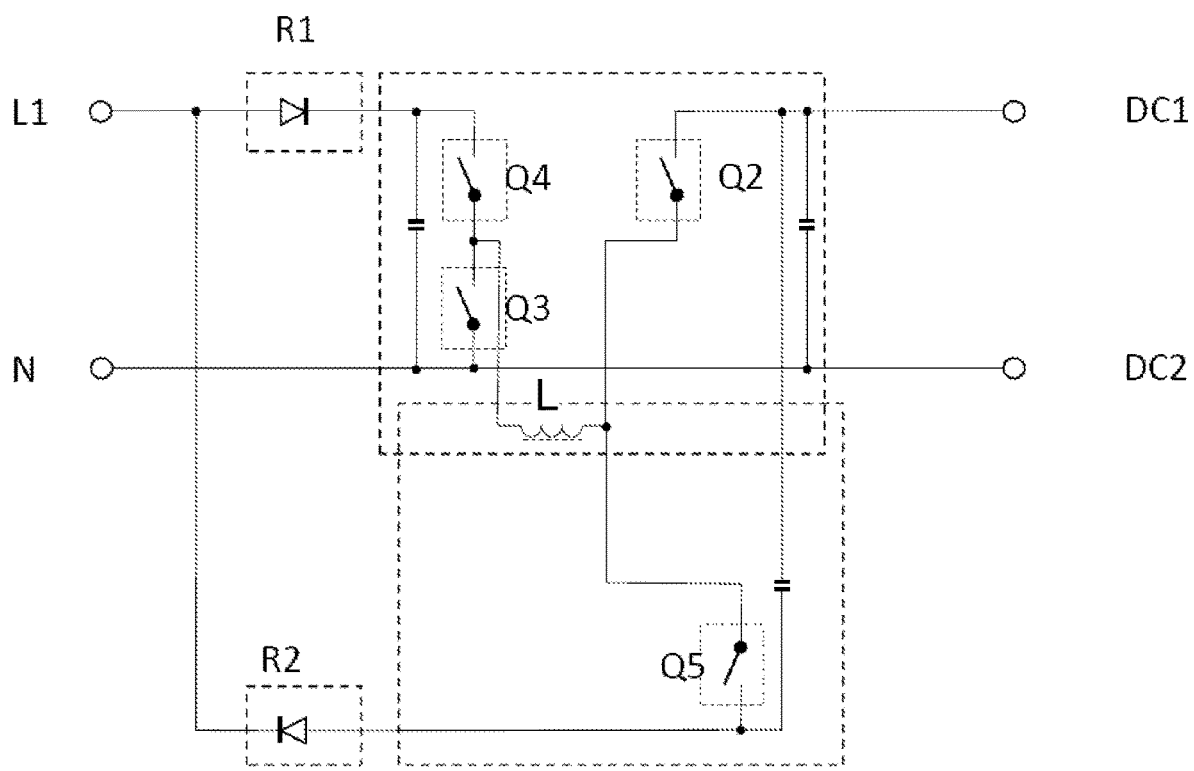
Figure 5:
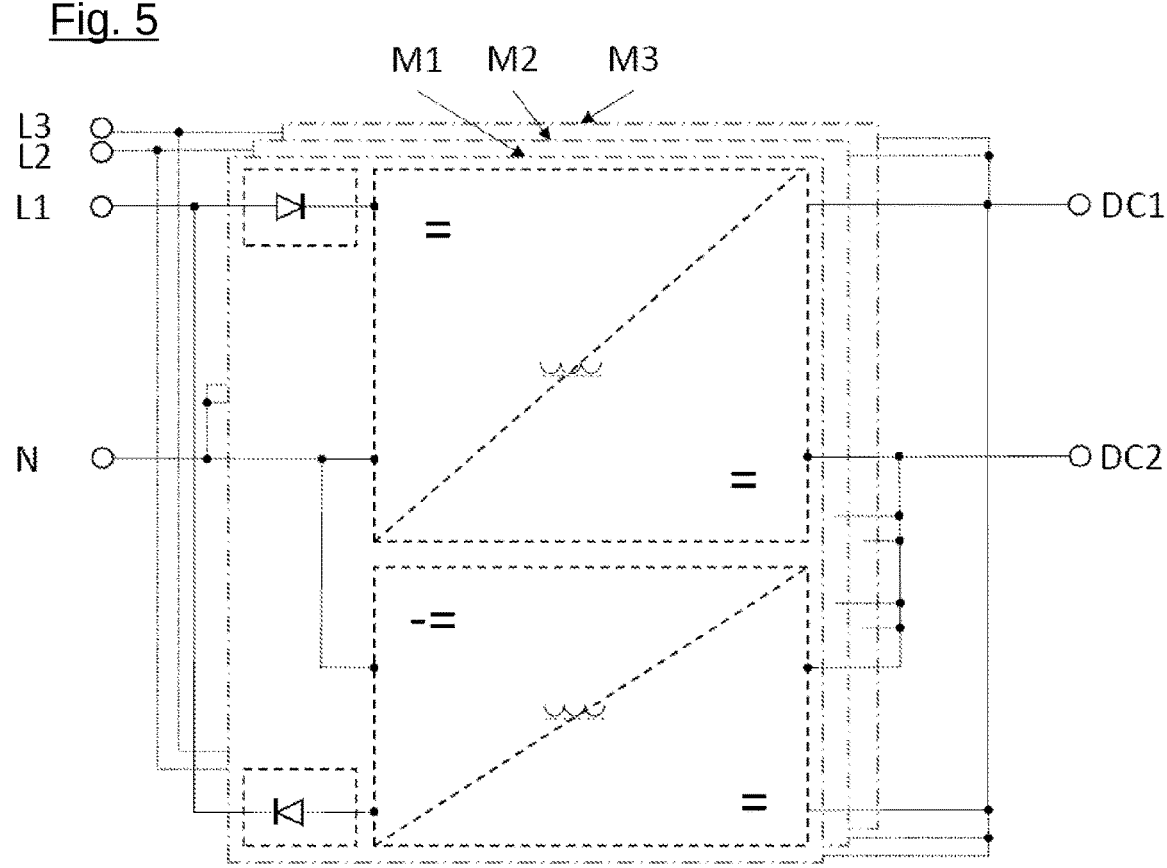
FIG. 5 shows a simplified schematic diagram of an arrangement for operation on a three-phase AC system.

FIG. 2b shows a variant including a non-inverting buck converter and an inverting buck-boost converter for the energy transmission direction from terminals L1, N to terminals DC1, DC2 for applications with lower voltage at terminals DC1, DC2 than the maximum value (e.g. the peak value at terminals L1, N) of the voltage at terminals L1, N, e.g. for charging a battery with 12V to 48V DC voltage at AC systems having 230V. In this case as well, two separate throttles are used as examples (FIG. 2b), or the throttle function is alternatively combined in one component (FIG. 4b). However, it should be noted here that only one charging current may be generated in the positive half-wave with the aid of R1, Q3 and Q4 as long as the input voltage is greater than the battery voltage.

The invention may also be used to couple a multiphase AC system and a DC system. For use, for example, in three-phase AC systems, three apparatuses according to the invention are used as modules made up of first half-wave rectifier R1 and non-inverting DC-DC converter B1 and opposing second half-wave rectifier R2 and inverting DC-DC converter B2 in an arrangement according to the invention according to FIG. 5. In other words, apparatuses according to the invention are used as modules for one phase each and connected to each other at their DC terminals. Storage throttles L and one or multiple switch elements of each module are advantageously used together in this case as well. Moreover, storage throttles L of the phases may also be magnetically coupled to each other, in particular to further reduce the installation volume.

In the multiphase design, one or two of the modules may be expanded to form an active filter F preferentially for frequencies in the range of the input AC frequency and its harmonics, in that a passive ripple current filter including at least one filter capacitor is connected to the phase circuit with the aid of at least one controllable switching element Q7 and this circuit is operated as a bidirectional DC-DC converter. An additional active filter may also be provided to increase the filter performance.

Figure 6:
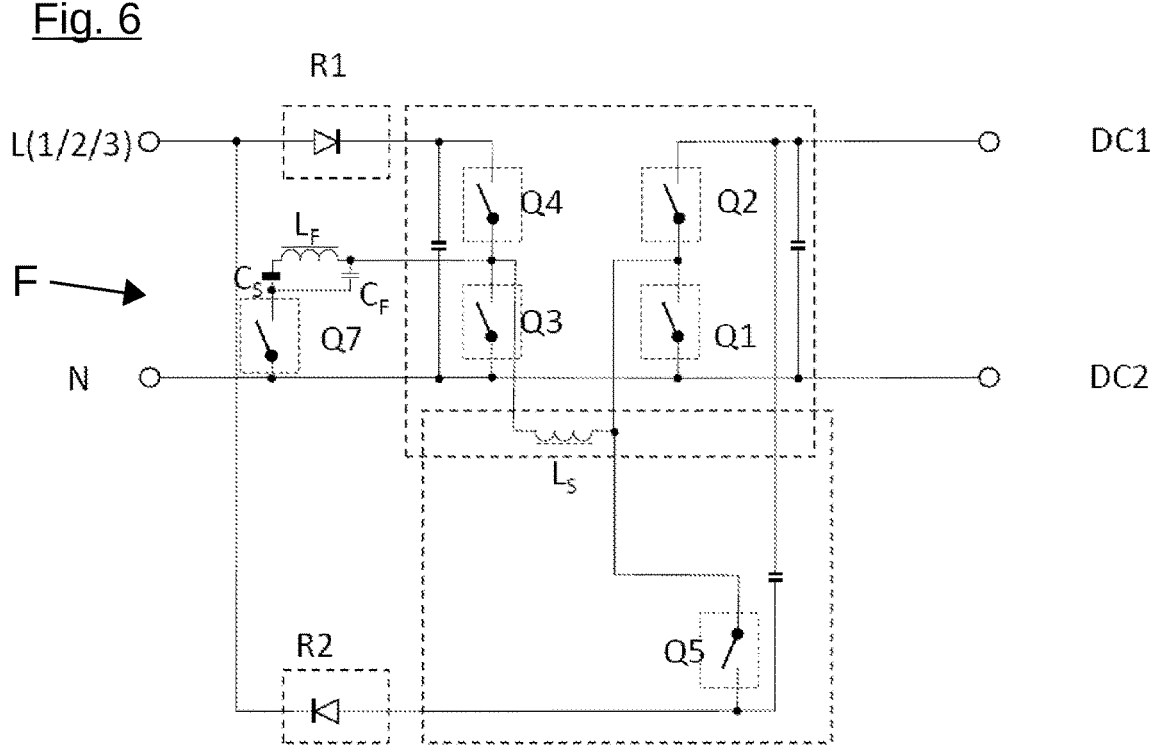
FIG. 6 shows a simplified circuit diagram of a module of an arrangement, including a simplified representation of the inner structure of the DC-DC converter used, which includes an active filter.
Figure 7A:
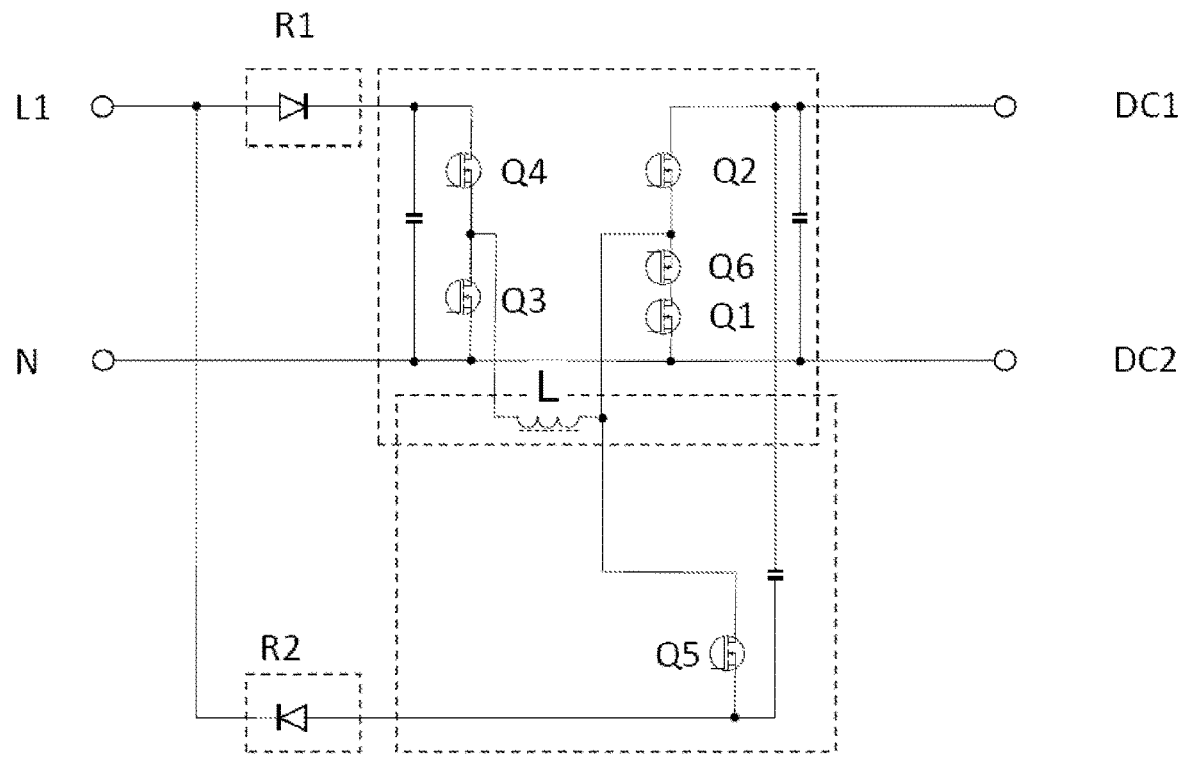
Figure 7B:
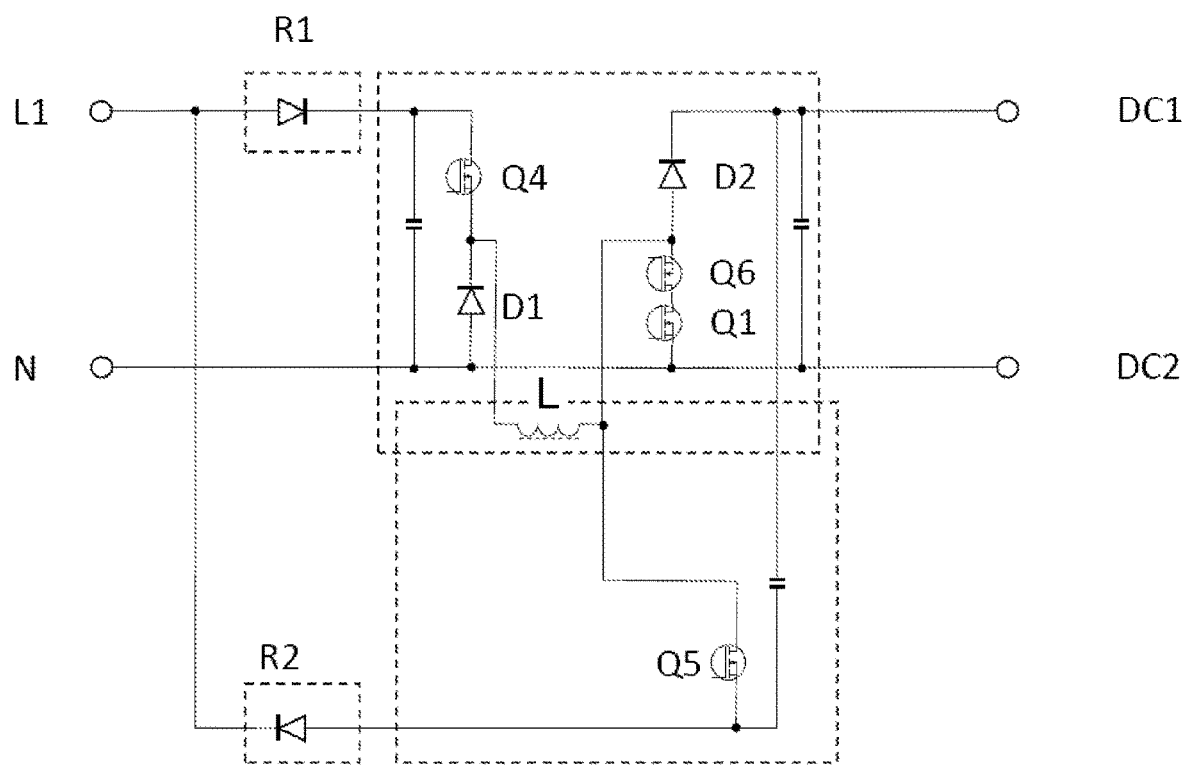
Figure 7C:
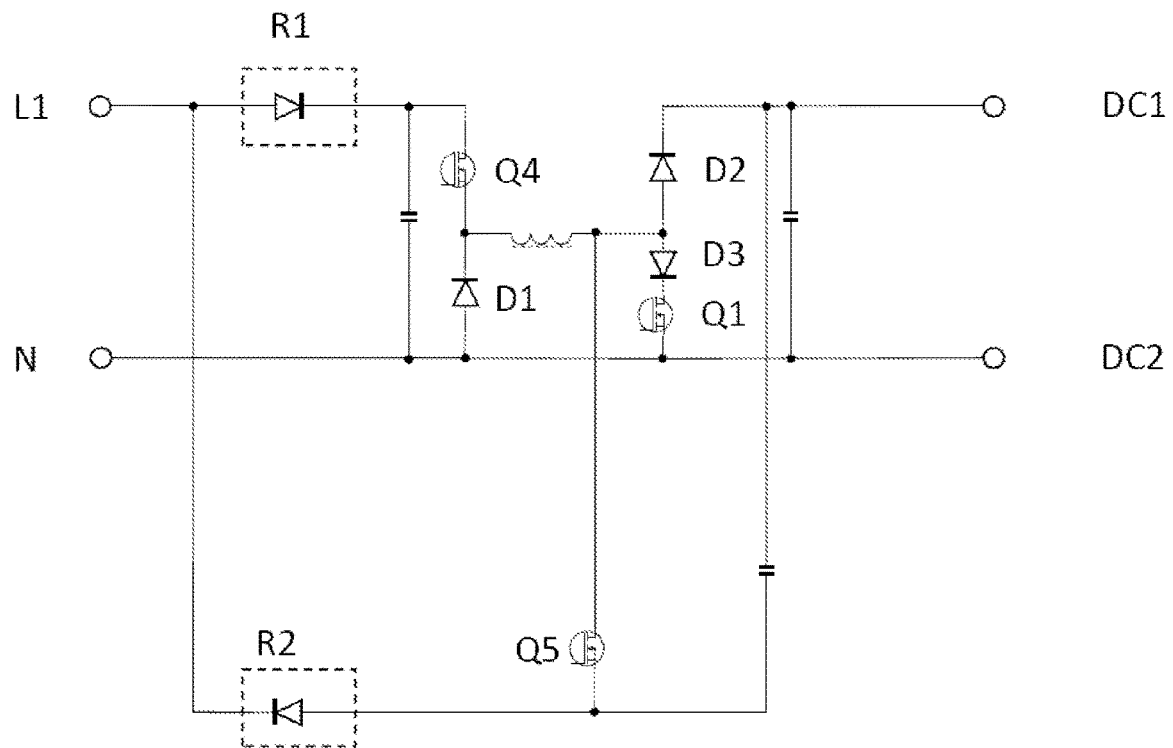
Figure 7D:
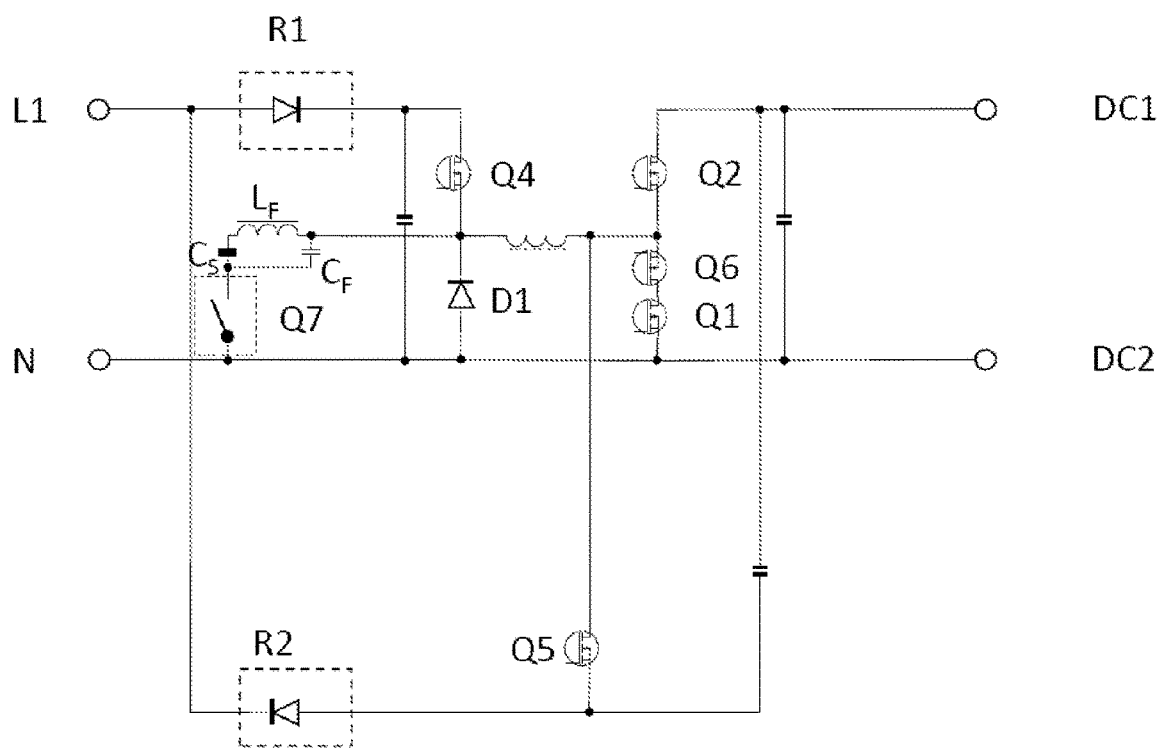

FIGS. 6 and 7d show one implementation of a ripple current filter in a converter module including a non-inverting and an inverting buck-boost converter. If a module of this type is not to be connected to an phase conductor of an AC system, the components of the inverting boost converter and its rectifier needed for this purpose, Q5 and R2, the components of buck converter Q3, Q4 and rectifier R1 as well as the assigned capacitors may be dispensed with.

Capacitor $C_S$ is a storage capacitor, which is charged in the clock pulse of the system frequency via terminals DC1, DC2 in buck mode, with the aid of a half-bridge converter made up of Q1 and Q2, or discharged via terminals DC1, DC2 in boost mode to stabilize the voltage at terminals DC1, DC2. $L_F$ or $C_F$ form a filter for the switching frequency for $C_S$.

It is possible that, in an apparatus according to the invention, the neutral conductor of an input AC system is led to the apparatus via terminal N and connected to the zero point of the circuits of DC-DC converters B1, B2. Alternatively, a zero point may also be generated in the device, e.g. by a star circuit including capacitors, in each case at least one first capacitor terminal at one of phase conductor terminals L1, L2, L3 and second capacitor terminals being connected to each other and possibly connected to neutral conductor terminal N.

The apparatuses according to the invention and the arrangement according to the invention operate without transformers and are thereby, and due to the single-stage energy conversion, particularly simple and thus compact and cost-effective and nevertheless permit a variety of functions, such as power factor correction, power recovery, reactive power supply and the like. They furthermore avoid leakage currents due to the constant electrical potential of the second side with respect to the neutral conductor or ground potential on the first side. As a result, the invention ensures a high degree of electrical safety, e.g. in that residual-current detectors are not impaired by leakage currents, and thus even very low leakage currents are reliably detectable. In addition, they are thereby also suitable for multiphase systems, in particular three-phase systems, on the first side. Two DC systems are also connectable to the apparatus, for example to charge another vehicle with the aid of direct current or to supply an isolated DC system.

The controlled switching elements used for DC-DC converters B1, B2 may be semiconductor switches, which may be conductive for a current direction independently of their activation, i.e. they may have an integrated diode function. For example, they are implemented by MOSFETs, thyristors or other controllable semiconductor switching elements or as combinations thereof, e.g. by series circuits or parallel circuits made up of switching elements of the same type or different types, which are connected in the same or opposite direction. Examples thereof are anti-serially switched MOSFETs or MOSFETs switched in parallel in the same direction, IGBTs and so-called wide band gap components, such as gallium-nitride or silicon-carbide components.

FIG. 7a shows an example of a circuit implemented with specific components of the converter illustrated in FIG. 4a for bidirectional operation with Si MOSFETs; FIG. 7b shows an example of unidirectional operation with a simplified fitting with diodes. In this case, a switching element Q6 was added antiserially to switching element Q1 to be able to block the current in this branch bidirectionally. The sequence of switching elements Q1 and Q6 may also be selected in reverse.

Switching element Q6 may then be replaced by a diode, as shown in FIG. 7c. If a circuit of this type is also to be optionally used as an active filter for the voltage at terminals DC1, DC2, this is implemented by coupling a storage element, in particular a storage capacitor $C_s$, directly or with the aid of a filter for the switching frequency, e.g. made up of a throttle $L_F$ and a capacitor $C_F$. No diodes D2, D3 are used for this purpose in the buck converter branch but rather controllable switching elements Q2, Q6 (FIG. 7d). Filter switch Q7 may be a relay or a controllable semiconductor switching element.

The stabilization and filtering of the half-bridge voltages are implemented in the usual way by capacitors via each half-bridge.

To reduce the total losses or also to facilitate an energy transmission from terminals DC1, DC2 to terminals L1, N, rectifiers R1, R2 may be designed as controlled, so-called (system)-synchronous rectifiers, e.g. with the aid of MOSFETs, thyristors or other controllable switching elements. A control circuit, which is not illustrated, is provided for driving control electrodes of the switching elements.

The circuit may be installed in a vehicle, a flying device or a ship, or it may be used in a stationary or mobile charging device for electrical storage units.

Depending on the operating state and switching element, the driving of the controllable semiconductor switches takes place at a switching frequency, as described below, simultaneously with the AC frequency at terminals L1, N or at a switching frequency, i.e., a frequency which is generated in a control device and which is significantly higher than the AC frequency, e.g. in the kHz range or above. This may be a permanently set frequency, or the frequency is set or regulated in the known manner as a function of the polarity and the absolute value of the voltage at terminals L1, N or the current through L1 or DC1 in such a way that an operation with continuous or intermittent current flow or current zero results. For the case that a DC voltage is present at terminals L1, N or is to be generated, the alternating current frequency is 0, and the particular switching state is set for the positive or negative AC half-wave, depending on the necessary polarity.

The pulse duty factor at the control electrodes of the switching elements, which are controlled with switching frequency, is set or regulated with the aid of the control device in such a way that an output variable, e.g. the input or output current or the transmission power, is set to a target value. In particular, the alternating current may be regulated synchronously to the alternating voltage with the aid of the system frequency, so that a higher power factor results for the AC system terminal. The output current is regulated over longer periods of time, e.g. over multiple AC waves, in such a way that the battery voltage and the alternating current, direct current and the like do not violate the limit values permissible in each case.

The driving is illustrated as an example and initially for an energy transmission from terminal L1, N to terminals DC1, DC2 for FIG. 6. The absolute value of the peak voltage of the AC voltage at terminals L1, N may be larger, smaller or equal to the DC voltage at terminals DC1, DC2.

The inverting boost converter operates during a negative half-wave of the AC voltage.

The non-inverting DC-DC converter operates during a positive half-wave of the AC voltage. If the AC voltage is lower than the DC voltage during the positive half-wave, the non-inverting DC-DC converter operates in boost mode (time period 1). If the AC voltage is higher than the DC voltage during the positive half-wave, the converter operates in buck mode (time period 2). If the instantaneous voltage then decreases during the positive half-wave and is again lower than the DC voltage, converter B1 operates once more in boost mode until reaching the instantaneous voltage of 0 (time period 3).

This functions in detail as follows:

For the energy transmission from terminals L1, N to terminals DC1, DC2, switch Q1 is controlled with the switching frequency during the positive half-wave of the AC voltage at terminals L1, N, if the latter is lower than the voltage at terminals DC1, DC2 (time period 1, time period 3). Switch Q2 is driven, inverted with respect to switch Q1, it being possible to additionally maintain a short dead time, in which switches Q1 and Q2 are switched off, in the switching transition. Switches Q1 and Q2 thus operate as boost converters for transmitting power from terminals L1, N to terminals DC1, DC2. Switch Q4 is switched on, while switches Q3 and Q5 are switched off.

However, f the AC voltage at terminals L1, N is higher than the voltage at terminals DC1, DC2 (time period 2), switch Q4 is controlled with the switching frequency. Switch Q3 is driven, inverted with respect to switch Q4, it being possible, in turn, to additionally maintain a short dead time in the switching transition. Switches Q3 and Q4 thus operate as buck converters between terminals L1, N and terminals DC1, DC2. Switch Q2 is switched on. Switch Q1 as well as switch Q5 are switched off.

Switches Q5 and Q2 are driven in an inverted manner with the switching frequency in the negative half-wave of the AC voltage at terminals L1, N. Switch Q3 is switched on, while switches Q1 and Q4 are switched off. Switches Q5 and Q2 thus operate as inverting boost converters from terminals L1, N to terminals DC1, DC2. Rectifiers R1 and R2 switch with the AC frequency.

For energy transmission in the opposite direction from terminals DC1 DC2 to terminals L1, N, rectifiers R1, R2 must be designed as controlled switching elements, e.g. with the aid of MOSFET transistors, thyristors or other controllable switching elements. In a positive half-wave of the AC voltage at terminals L1, N, rectifier R1 designed as a controlled switching element is switched on, and rectifier R2, which is also designed as a controlled switching element, is switched off. This is reversed in a negative half-wave.

If the AC voltage at terminals L1, N is lower than the voltage at terminals DC1, DC2, switches Q1 and Q2 are controlled as buck converters from terminals DC1, DC2 to terminals L1, N with the switching frequency, inverted with respect to each other, possibly with a short dead time. Switch Q4 is switched on. Switch Q3 as well as switch Q5 are switched off.

If the AC voltage at terminals L1, N is higher than the voltage at terminals DC1, DC2, switch Q3 is controlled with the switching frequency. Switch Q4 is driven, inverted with respect to switch Q3, it being possible, in turn, to additionally maintain a short dead time in the switching transition. Switches Q3 and Q4 thus operate as boost converters from terminals DC1, DC2 to terminals L1, N. Switch Q2 is switched on. Switch Q3 as well as switch Q5 are switched off.

In the negative half-wave of the AC voltage at terminals L1, N, the switching element forming rectifier R2 is switched on. Switches Q5 and Q2 are driven in an inverted manner with the switching frequency. Switch Q3 is switched on, while switches Q1 and Q4 are switched off. Switches Q5 and Q2 thus operate as buck converters for transmitting power from terminals DC1, DC2 to terminals L1, N (i.e. inverting with respect to L1, N).

The controllable switching elements forming rectifiers R1 and R2 are switched on alternately. They switch with the AC frequency of the AC system if an AC voltage is present there or is to be generated by the device described here. If a DC voltage is present or is to be generated at terminals L1, N, they are driven in such a way that the polarity generated by the device corresponds to the present or required polarity.

Switch Q7 of filter F is switched off in all these cases. If the phase circuit is to be used to stabilize the voltage at terminals DC1, DC2 in the time range, in particular, for example, against a voltage ripple, which originates in the battery charge with a pulsating current from one or multiple other phase circuits, switch Q7 is switched on. Switches Q3, Q4 and Q5 are switched off.

Switches Q1 and Q2 are then driven, inverted with respect to each other, with a switching frequency, so that the backup capacitor is charged with power from terminals DC1, DC2 by operating switches Q1 and Q2 in buck mode as long as the voltage at terminals DC1, DC2 is above a predefined value. The backup capacitor is discharged by the power transmission to terminals DC1, DC2, due to the operation of switches Q1 and Q2 in boost mode, as long as the voltage at terminals DC1, DC2 is below a predefined value. The absolute value of the charging and discharging current is essentially regulated synchronously with the voltage ripple at terminals DC1, DC2. The charging and discharging with the aid of the buck or boost mode, as well as the level of the filter current, may also be derived from other variables, such as input AC voltages L1 through L3.

The level of the switching frequencies used in each case may be varied as a function of the operating state, i.e., for example, the voltages, currents and polarity of the voltage at terminals L1, N, to influence the current ripple during the switching frequencies, the spectrum of the emitted interference or the switching losses, to the extent that this is known for buck-boost circuits.

Voltage and current measuring devices at the input and output terminals of the converter as well as at the throttle, as well as temperature sensors generate signals necessary for the control or regulating device for setting the switching-frequency control signals, i.e. their frequency, modulation and dead times. The measuring devices and sensors are not illustrated.

The direction of energy transmission is controlled in such a way that it remains constant for half or full periods of the input AC voltage to supply a DC system connected to terminals DC1, DC2 or to charge a storage unit connected there or to supply loads connected to terminals L1, N or the system located there.

However, the direction of energy transmission may also be controlled in such a way that it changes during the half-waves, phase-shifted thereto, for example to conduct reactive power in the known manner to the DC side, if this is initiated by a higher-level control device.

Such commands of the direction of energy transmission may be generated by requests from a communication system of the vehicle, which contains a charging device described here, with the aid of a system operator or a system regulating device. They can also be generated to charge a load connected to the AC side or another vehicle to be charged there with the aid of DC or AC voltage or the energy storage unit thereof.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for coupling power systems with a single-phase AC system or a further DC system, the apparatus comprising:
    a non-inverting DC-DC converter; and
    an inverting DC-DC converter,
    wherein the non-inverting DC-DC converter and the inverting DC-DC converter each have a first input and/or output and a second input and/or output,
    wherein the first input and/or output of the non-inverting DC-DC converter is connected in series to a first converter valve to form a first series circuit,
    wherein the first input and/or output of the inverting DC-DC converter is connected in series to a second converter valve to form a second series circuit,
    wherein the first and second series circuits are connected in parallel,
    wherein the second inputs and/or outputs are connected in parallel,
    wherein terminals of the first and second series circuits are connected to a first input and/or output of the apparatus,
    wherein terminals of the first and second series circuits of the second inputs and/or outputs of the DC-DC converter are connected to a second input and/or output of the apparatus, and
    wherein the non-inverting DC-DC converter and the inverting DC-DC converter have shared switches.

2. The apparatus according to claim 1, wherein the non-inverting DC-DC converter and the inverting DC-DC converter have a shared coil.

3. The apparatus according to claim 1, wherein the power system is a DC system and/or a motor vehicle electrical system.

4. The apparatus according to claim 1, wherein the non-inverting DC-DC converter and inverting DC-DC converter are transformer-less buck converters, boost converters and/or buck-boost converters.

5. The apparatus according to claim 1, wherein at least one of the non-inverting DC-DC converter and inverting DC-DC converter is a bidirectional DC-DC converter.

6. The apparatus according to claim 1, wherein a terminal of a first input and/or output of one of the non-inverting DC-DC converter or of the apparatus is connected directly or indirectly to a terminal of the second input and/or output of the non-inverting DC-DC converter or of the apparatus, with switches or fuses being connected therebetween.

7. The apparatus according to claim 1, wherein the first converter valve and/or the second converter valve is/are a bidirectional converter valve.

8. The apparatus according to claim 1, wherein the apparatus includes a filter for filtering current ripples on a second side of the non-inverting DC-DC converter.

9. An arrangement for coupling a DC system with a multiphase AC system, wherein the arrangement includes at least two apparatuses, each of the two apparatuses being the apparatus according to claim 1.

10. The arrangement according to in claim 9, wherein the first inputs and/or outputs of the apparatuses include a first terminal for connection to one phase conductor each of the multiphase AC system, and wherein the second terminals of the first input and/or output of the apparatuses are connected to a neutral conductor of the multiphase AC system.

11. The arrangement according to in claim 10, wherein the second inputs and/or outputs of the apparatuses are connected in parallel.

12. The arrangement according to in claim 9, wherein coils of the DC-DC converters of the apparatuses are magnetically coupled.

13. A method for coupling power systems, in particular a DC system of a motor vehicle electrical system, with a single-phase AC system, the method comprising:
connecting the single-phase AC system to an input; and
connecting the DC system an output,
wherein during a positive half-wave of the AC voltage present at the input, a first half-wave rectifier and a non-inverting DC-DC converter connected downstream from the first half-wave rectifier are current-conducting, and
wherein during a negative half-wave of the AC voltage present at the input, a second half-wave rectifier and an inverting DC-DC converter connected downstream from the second half-wave rectifier are current-conducting.

14. A circuit arrangement for a DC-DC converter module, comprising:
a non-inverting DC-DC converter;
an inverting DC-DC converter, which include shared components including shared converter valves and a shared storage throttle;
a first input and output having three terminals, one for a first positive potential, one for neutral potential and one for negative potential; and
a second input and output having two terminals, one for a second positive potential and one for the neutral potential, the terminals being connected to each other for the neutral potential,
wherein the terminal for the second positive potential is connected to the terminals for the neutral potential via a first converter valve and a second converter valve, and
wherein the terminal for the first positive potential is connected to the terminals for the neutral potential via a third converter valve and a fourth converter valve.

15. The circuit arrangement according to claim 14, wherein nodes are connected to each other between the first and the second convert valve, on the one hand, and the third and the fourth converter valve, on the other hand, via the storage throttle, and
wherein the node between the first and the second converter valve is connected to the terminal for the negative potential via a fifth converter valve.

16. The circuit arrangement according to claim 15, wherien a first converter valve is supplemented with the aid of a second converter valve connected in series thereto or a rectifier component.

17. The circuit arrangement according to claim 15, wherein the circuit arrangement includes a capacitor, which is connected to the neutral potential via a switch and to the node between the third and fourth converter valves directly or indirectly via a filter.

* * * * *